Jan. 2, 1934.  A. T. CARTER ET AL  1,942,136
LIGHT SIGNAL LENS
Filed Jan. 12, 1927

A. T. Carter, and
E. W. Moore,
INVENTORS.

BY Neil D. Reston
their ATTORNEY

Patented Jan. 2, 1934

1,942,136

UNITED STATES PATENT OFFICE 1,942,136

LIGHT SIGNAL LENS

Ainslie T. Carter, Coldwater, and Edmund W. Moore, Rochester, N. Y., assignors to General Railway Signal Company, Rochester, N. Y.

Application January 12, 1927. Serial No. 160,659

2 Claims. (Cl. 177—329)

This invention relates to light signals in general and has more particular reference to a lens for use in such signals.

In order that a light signal placed along a trackway be visible to an observer on the trackway it is necessary that such observer come within the field covered by the light projected from the signal. It is usual, in light signals, to have the projecting lens, reflector or the equivalent, arranged so that the projected light covers a considerable length of the trackway. However, on approaching such a light signal, when an observer comes so near to the signal that the line connecting him with the signal makes an angle of approximately 40° with the optical axis of the lens, any progress nearer the signal will generally take the observer outside of the field covered by the projected light beam so that the signal becomes invisible. Under certain conditions however, it is highly desirable, after having once come within the field of the projected light, that the signal remain visible to the observer until he has approached to a point directly below, or opposite, the same, or in other words, that the signal be visible until it is passed.

With the above and other considerations in mind, it is proposed, in accordance with the present invention, to provide a lens for use in a light signal, so formed as to project a light beam which will extend from the optical axis of the lens through an angle of substantially 90°, whereby an observer approaching the signal along a trackway in connection with which such signal is used, after having once picked up the signal will have it in view until the signal is passed.

Further objects, purposes and characteristic features of the present invention will appear as the description progresses, reference being had to the accompanying drawing, showing, solely by way of illustration, one physical embodiment of the invention. In the drawing:—

Figure 1:
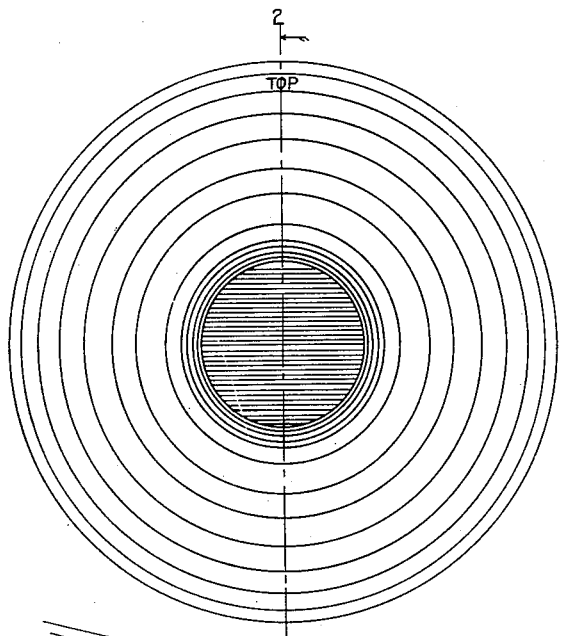
Fig. 1 is a front elevation of a lens constructed in accordance with this invention.

Referring to the drawing, there is shown an optical or outer doublet lens for use by itself or in combination with an inner lens for forming a usual doublet combination.

The lens as shown comprises three separate and distinct zones, a main zone 1, a central zone or bull's eye 2 and an intermediate zone 3 connecting the main zone with the bull's eye and formed of conical shape. Each of the zones just mentioned has a series of stepped portions designated respectively, $1^1$, $2^1$ and $3^1$, the steps $1^1$ and $3^1$ being concentric with each other and annular in form, while the steps $2^1$ are parallel to each other and are of straight horizontal formation.

Figure 2:
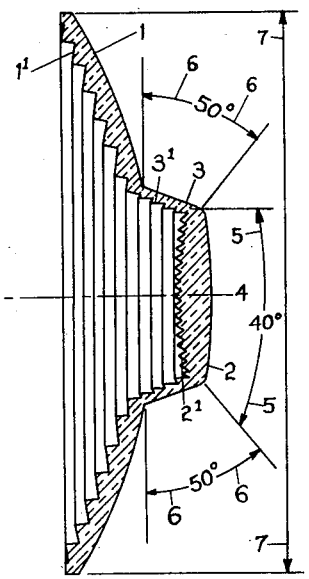
Fig. 2 is a longitudinal side elevation of the lens of Fig. 1.
Figure 3:
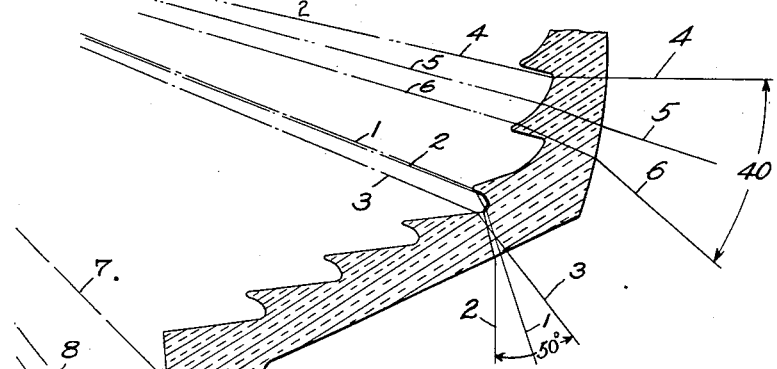
Fig. 3 is a diagrammatic view showing the paths of travel of representative light beams.
Figure 3A:
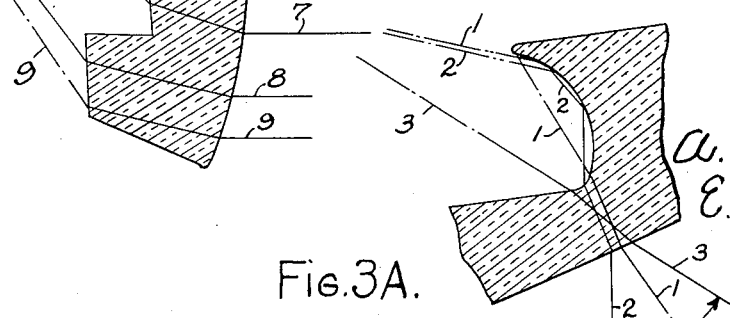

The zone 1, having the steps $1^1$, is designed to project light from a source of light L placed at the focus of the lens, in a direction approximately parallel to the optical axis 4—4 of the lens with limits approximately as indicated in Fig. 2 by arrows 7—7.

The zone 2 has its steps $2^1$ so designed as to project light in a direction parallel to the axis 4—4 and also downwardly therefrom, up to and including a 40° angle, approximately, with the axis 4—4, the spread of light projected by this part of the lens being indicated in Fig. 2 by arrows 5—5.

It should be noted that the beam of light projected by the zone 2 is not symmetrical relative to the optical axis 4—4, in as much as the light is projected away from the axis only on one side thereof, so that in using the lens it should be placed with the top pointing substantially upwardly as indicated in Fig. 1, so that the downwardly projected portion of the beam 5—5 will be directed toward the trackway.

The intermediate zone 3 has its steps $3^1$ so designed and arranged as to project light throughout an angle of approximately 50° measured from the vertical toward the optical axis 4—4, and throughout the entire periphery of the lens, and this projected light beam is indicated diagrammatically by the arrows 6—6.

As can be readily understood from the above explanation, taken in connection with the drawing, the present lens projects light forwardly along the optical axis 4—4 and downwardly due to the two zones 2 and 3, the zone 2 covering a 40° angle measured downwardly from the axis 4—4, while the zone 3 projects light throughout a 50° angle around 360° so as to give a total projection of light downwardly from the axis 4—4 of substantially 90°. Thus an observer traveling along the trackway with which this lens is used, after once having come within the beam of projected light, will remain in such projected beam, and hence the signal will remain visible to the observer, until he has reached a point directly below, or opposite, the signal, when further progress will render the signal invisible to the observer, in as much as he will have passed the signal.

By the provision of the intermediate zone 3 with its resulting hollow conical fan of light beams, the danger is avoided of an observer coming within the 50° angle defined by the arrows 6—6 and then, being unable to see the signal, possibly failing to note a change in the signal aspect with resulting delay and danger of accident.

While the invention has been described with considerable particularity in the above specification, such description is given solely for the purpose of illustration, and is not intended, in any manner whatsoever, in a limiting sense. Obviously the invention can assume many physical forms, and is susceptible of numerous modifications, and all such forms and modifications are intended to be included within this invention, as come within the scope of the appended claims.

Having described our invention, we now claim:—

1. In a cupped lens for light signals, a main portion having concentric prisms for projecting light along the optical axis of the lens, a forwardly projecting bull's eye bearing parallel prisms for projecting light along the optical axis and through an angle of approximately 40° to the axis, and a portion intermediate the main portion and the bull's eye, and concentrically stepped, for projecting light through an angle of approximately 50° measured from right angles to the optical axis toward said optical axis.

2. In a lens for light signals, a cup like lens, having a rim portion, a bottom portion, and an interconnecting side portion, concentric steps on the rim and side portions, and straight parallel steps on said bottom portion, the steps on each portion directing light throughout a definitely limited solid angle, the steps on the rim directing light parallel to the optical axis of the lens, the steps on the bottom directing light parallel with, and throughout an angle of approximately 40° to, the optical axis, and the steps on the side directing light throughout an annulus of approximately 50° measured from right angles to the optical axis, toward said optical axis.

AINSLIE T. CARTER.
EDMUND W. MOORE.